(12) United States Patent
Layne

(10) Patent No.: US 6,578,321 B2
(45) Date of Patent: *Jun. 17, 2003

(54) EMBEDDABLE MOUNTING DEVICE

(75) Inventor: Harry R. Layne, Covington, LA (US)

(73) Assignee: Steel Block, Inc., Covington, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/866,852

(22) Filed: May 30, 2001

(65) Prior Publication Data

US 2001/0023772 A1 Sep. 27, 2001

Related U.S. Application Data

(62) Division of application No. 09/630,133, filed on Aug. 1, 2000, which is a division of application No. 09/148,501, filed on Sep. 4, 1998, now Pat. No. 6,111,197.

(51) Int. Cl.[7] .............................. H01J 5/00; H01J 15/00
(52) U.S. Cl. .......................... 52/36.4; 52/27; 52/220.1; 174/48; 174/49; 174/50; 220/4.02
(58) Field of Search ........................ 52/561, 106, 379, 52/315, 220.1, 309.1, 282.1, 591.2, 745.1, 36.4, 27, 576; 174/48, 50, 58, 49; 220/3.2, 3.3, 4.02

(56) References Cited

U.S. PATENT DOCUMENTS 5,649,391 A * 7/1997 Layne ........................ 52/36.4

* cited by examiner

Primary Examiner—Jeanette Chapman
(74) Attorney, Agent, or Firm—Shinjyu Global IP Counselors, LLP

(57) ABSTRACT

A method of permanently mounting an electrical box block in a concrete block wall. The electrical box block preferably includes three generally rectangular metal members, four vertical spacer members and two horizontal metal members. The first rectangular metal member and the second rectangular metal member preferably have equal dimensions. A first pair of vertical spacer members is secured between the first and second rectangular metal plate member in a manner to create at least one reinforcing bar and cement receiving cavity between the first and second metal members. The two of the vertical spacer members and the two horizontal metal members are attached to the third rectangular metal member to form an electrical housing or box.

20 Claims, 6 Drawing Sheets

EMBEDDABLE MOUNTING DEVICE

CROSS-REFERENCE TO RELATED APPLICATIONS

This application is a divisional application of U.S. patent application Ser. No. 09/630,133 filed on Aug. 1, 2000, which is a divisional application of U.S. patent application Ser. No. 09/148,501 filed on Sep. 04, 1998, now U.S. Pat. No. 6,111,197.

BACKGROUND OF THE INVENTION

1. Field of the Invention

This invention generally relates to an embeddable mounting device, which is mounted in a block wall. More specifically, the present invention relates to an embeddable mounting device, which is utilized to permanently install electrical devices, such as fixtures, lights, switches, receptacles, speakers, etc., or a structural support member within a concrete block or masonry wall in a security facility, such as a jail, prison, juvenile detention center, psychiatric hospital, etc.

2. Background Information

Many buildings are currently being constructed of concrete blocks. It has been a common practice within the construction industry that all concrete block walls have affixed electrical boxes that accommodate the final connections of emergency lights, intercom speakers, switches, receptacles, etc. Also it is often necessary to attach structural support members such as joists to the concrete block walls.

Prior to the setting of the block walls, electric conduit is installed either in the concrete floor slab or hung from the ceiling. One common practice in the construction industry, and employed by many electricians, is to bring or "stub up" the electric conduit a distance of about six to twelve inches above the finished slab. The masonry blocks are then set on the slab and over the electric conduit. As the concrete block walls increase in height, the electrician must add additional lengths of the conduits. The electrical boxes are then linked to the ends of the conduits when the wall reaches the specified height to the electrical boxes. This means that the electricians must work in concert with the masons to assure the proper location and height of the electrical boxes and to eliminate any delay that might be experienced. After the masons have constructed the concrete wall, the electrician must begin his work through the final connections. If the masons have not broken a hole in the concrete block to expose the conduit, the electrician must first locate the area in which the fixture is to be installed and must force entry into the block by breaking a hole or cutting a hole in the block. If the hole is formed in the correct location within the concrete block wall, the electrician will find the conduit and wires leading out of the conduit and install it. The next step for the electrician to conclude the final installation of the intercom speakers, the electrical receptacles or switches, he must attach a faceplate to the electric box so that the hole in the block is covered. The conventional method of installation creates a hole that cannot be defined in size and often the hole created cannot be covered by the electric fixture faceplate. The conventional method of installing the conduit within the block often causes the conduit to be placed out of plumb. In that event, the electric box that is to receive the faceplate inevitably is not plumb and the faceplate is often not level. As this often occurs, the added cost of having the masons return to patch the hole results in a delay to the progress of the job and an overrun in cost.

This invention is especially useful in the detention industry. It is a common practice within the detention industry for their new construction projects to construct the walls of a detection facility out of concrete blocks. Detention wall construction requires that the interior of the blocks have a cement agent poured into the cavity or cavities and that the cavities have one or more reinforcing rods extending from the interior of the block into the concrete blocks that are above and below. One Example of a steel block is disclosed in U.S. Pat. No. 5,648,391, issued to Mr. Layne, on Jul. 22, 1997. The entire disclosure of this patent is hereby incorporated herein by reference.

In view of the above, there exists a need for an embeddable mounting device which overcomes the above mentioned problems in the prior art. This invention addresses this need in the prior art as well as other needs, which will become apparent to those skilled in the art from this disclosure.

SUMMARY OF THE INVENTION

One object of this invention is to provide an embeddable fixture mounting device that is used to install electrical fixtures or devices within a concrete block wall, a masonry wall or a pre-cast concrete wall.

Another object of the present invention is to provide an embeddable mounting device that will not require additional plastering of the walls when the fixture or wiring device is installed.

A further object of the invention is to provide a method of permanently and securely mounting a fixture to a wall that access can not be accessed without the use of security tools.

Another object of the present invention is to provide an embeddable mounting device that will assist in the installation of a structural support member such as a joist.

The new steel electrical box block in accordance with the present invention is designed to eliminate some of the problems that have been experienced by the construction industry. The electrical box block of the present invention reduces the cost of installation and provides a steel block that is designed specifically to receive or become the in-wall electrical box. The electrical box block can be either a half-size block or a full size block.

In accordance with one aspect of the present invention, a steel electrical box block is provided which includes three rectangular metal plates coupled together by four vertical spacers and two horizontal plates. The first rectangular metal plate member has a first inner surface, a first outer surface, a first length measuring between seven inches and eight inches, a first height measuring between seven and eight inches, a first depth measuring between seven inches and eight inches and a first thickness of either ten gauge steel, twelve gauge steel, fourteen gauge steel, one-quarter inch or one-half inch. The second rectangular metal plate member has a second inner surface, a second outer surface, a second length of measurement equal to the first length, a second height equal to the first height, a second depth equal to the first depth and a second thickness equal to the first thickness. The third rectangular metal plate member which is a removable face plate has a third inner surface, a third outer surface, a third length of measurement equal to the first length, a third height equal to the first height, a third depth equal to the first depth and a third thickness equal to the first thickness. Of course, these rectangular metal plate members can have other dimensions as need and/or desired of a particular application. Also, an octagonal or square hole of an appropriate size is formed in the third rectangular metal plate member to accommodate the specific fixture that will be utilized.

The third rectangular metal plate will be further equipped with holes of varying sizes so that security screws can be used to set the plate. The steel electric fixture box has also two pair of spacer members, each having two (2) one-quarter (¼") inch radius breaks that extend to each side of the block a length of one to two inches. One pair of spacer members is secured between the first inner surface and the second inner surface in a manner to create at least one reinforcing rod and cement receiving cavity between the first and second metal plate members. These spacer members hold the first and second metal plate members in parallel relationship with each other. When the first and second metal plate members simultaneously contact a planar surface, the first and second metal plate members are both perpendicularly oriented to the planar surface. The first and second outer surfaces of the first and second rectangular metal plate members are spaced apart a spacing distance measuring between three (3") and five (5") inches. The area filled by the cement/grout mixture that is placed between adjacent blocks is further used to present a plurality of the concrete blocks together to form the wall. The second pair of spacer members is secured between the second inner surface and the third inner surface in a manner to create a housing chamber to receive the conduit and mount the electric fixture or electric device as required.

It is the object of this invention to provide a means for easily connecting low voltage lines and those above 115 volts that must be run in conduit. Also, high voltage lines (electrical power lines or the like) and low voltage lines (speaker cables or the like) can easily be connected by using female snap-on connectors. This inventor visualizes that the speakers are field applied to the faceplate with a male pigtail connector. In instances in which high voltage electrical components are required, it is the intent of this invention that a flexible piece of conduit securely attached to the rigid conduit will provide a sufficient raceway for bringing the electrical wires to their final termination point. The final termination point will be a UL listed electrical box attached to the faceplate so that the appropriate electrical switches or receptacles are placed therein. Upon the termination of the wires into the electrical box which has been attached to the backside of the steel block electrical fixture box faceplate, the faceplate will then be attached to the steel block electrical fixture box using security screws and an electrical faceplate shall be attached.

These spacer members are placed in a manner to hold the second and third metal plate members in parallel relationship with each other such that when said second and third metal plate members simultaneously contact a planar surface the second and third metal plate members are both perpendicularly oriented to the planar surface, and in a manner such that the second and third outer surfaces are spaced apart a spacing distance measuring between three (3") and four and one-half (4½") inches. Each of the spacer members are of varying heights depending upon the reinforcing bars that may be run horizontally at both the top and bottom.

It would also be desirable to have a method for mounting an electric fixture, including electrical switches/receptacles, electrical intercom speakers, etc., correctly sized, level and plumb permanently within a concrete block wall that did not require degradation of the wall structure by forming a cavity within the pre-existing concrete blocks when it became necessary to install a fixture as identified above.

The steel electrical box block has its first and second rectangular metal plate members sized to allow the masonry setting installation of the steel block within the total concrete block wall to be filled with a cementing slurry mixture and the grouting of all edges. It had been thought originally that direct contact of the steel block with the adjacent concrete blocks might reduce the potential loosening effect that was thought to occur by the shrinking or squeezing out of the cement slurry or grouting when the blocks and mounting devices were laid and grouted in place as with a standard concrete block installation. Testing has proven that steel blocks, properly grouted, do not experience the shrinking or loosening effect. Proper grouting, "cementing slurry" filling and properly set reinforcing rods are mandatory for the proper setting of all steel blocks. Steel blocks that are grouted and filled properly are no more or less vulnerable to being "dug out" then normal concrete blocks are. The first and second rectangular metal plate members create a cement receiving cavity that is aligned with the reinforcing bar and cement receiving cavities of conventional concrete blocks and into which a vertical reinforcing bar and cementing slurry is introduced during the setting (installation) of the device. The term "cementing slurry" is used herein to indicate any of the cementing agents conventionally poured into the reinforcing bar and cement receiving cavities of conventional concrete blocks that are utilized to add strength and greater utility to the construction. The steel electrical box block has its second and third rectangular metal plate members sized to form the back plate (second metal plate member) and the face plate (third metal plate member) of the electrical box.

Another aspect of the invention is a permanently and securely mounted steel electrical box block for the housing of activated electrical fixtures. The method includes the step of installing the steel electrical box block during the setting of the concrete block walls. The steel electrical box block as described above is placed into the wall in a manner so that the masonry contractor can place one reinforcing bar into the aligned reinforcing bar receiving cavity and/or horizontally in the space above or below the cavity. Prior to the final hardening of the cement slurry, the reinforcing bar members are placed vertically into the now filled bar receiving cavities and allowed to protrude enough to engage one or more courses of concrete blocks that will be set in the following concrete block courses. The cementing slurry mixture is then allowed to harden. After the cementing slurry mixture has hardened sufficiently to at least hold the mounting device in place, a fixture or wiring device can be permanently fixed to the wall by using security screws.

In accordance with another aspect of the present invention, an embeddable mounting device is provided in the form of joist support block. The joist support block basically includes a pair of generally rectangular metal members, three metal spacer members, two vertical metal walls or members and a horizontal metal wall or member. The two vertical metal walls or members and a horizontal metal wall or member form a U-shaped support member, which allows the structural support member or joist to be easily coupled to the joist support block.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
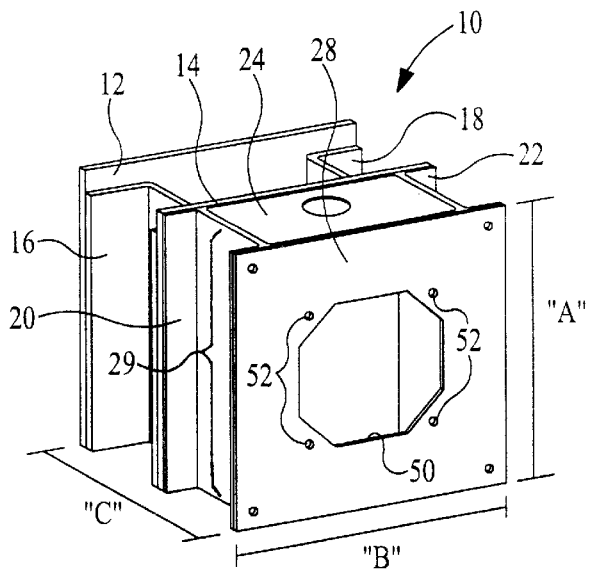
FIG. 1 is a perspective view of an embeddable mounting device in the form of an electrical box block in accordance with one embodiment of the present invention.
Figure 5:
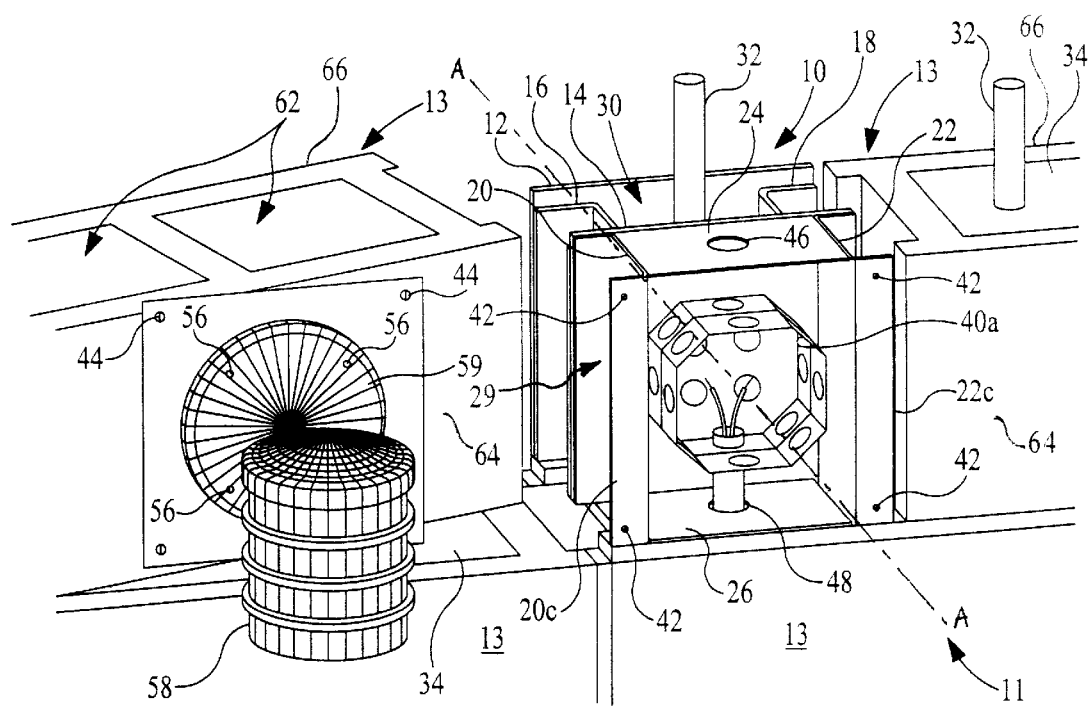
FIG. 5 is a partial perspective view of the embeddable mounting device or block partially mounted in a block wall in which the electrical box is being used to mount a lighting fixture in accordance with the first embodiment of the present invention.
Figure 6:
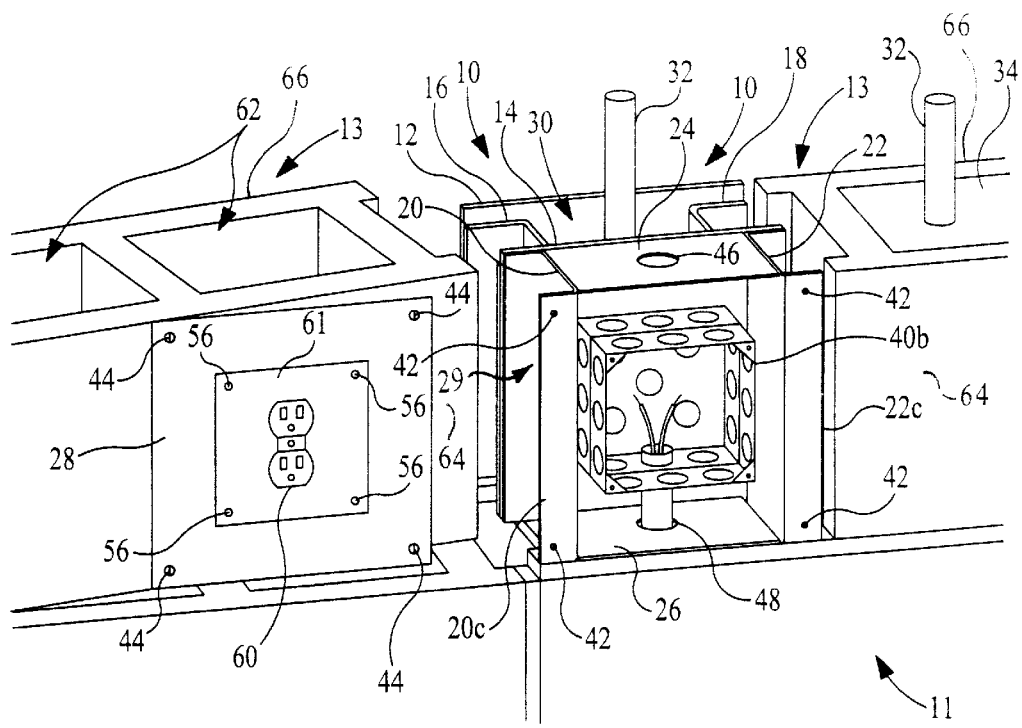
FIG. 6 is a partial perspective view of the embeddable mounting device or block being mounted in a block wall in which the embeddable mounting device or block is designed for an electrical wiring device such as a receptacle.

Referring initially to FIG. 1, a perspective view of an embeddable mounting device or electrical box block 10 is illustrated in accordance with one embodiment of the present invention. Mounting device or block 10 basically includes three generally rectangular metal members 12, 14 and 28, four metal spacer members 16, 18, 20 and 22, and two horizontal metal members 24 and 26. Preferably, these metal members are constructed of metal plates to form a metal block, which are capable of mounting an electrical fixture or device. As seen in FIGS. 5 and 6, the embeddable mounting device or electrical box block 10 is embedded within a block wall 11 constructed of blocks 13 such as cinder blocks, concrete blocks or masonry blocks. The embeddable mounting device or electrical box block 10 is designed to be grouted just like the cinder blocks, concrete blocks or masonry blocks 13. Thus, the embeddable mounting device or electrical box block 10 preferably has a height "A" between about seven inches and nine inches, a length "B" between about seven inches and seventeen inches and a depth or width "C" preferably between seven inches and nine inches. This size of block 10 allows the block to completely fill the space normally occupied by a conventional cinder block, concrete block or masonry block. While the mounting device or electrical box block 10 is illustrated as a half block, it will be apparent to those skilled in the art from this disclosure that the mounting device or electrical box block 10 can be a full block, i.e., the same size as the cinder blocks, concrete blocks or masonry blocks 13.

As seen in FIGS. 5 and 6, the electrical box block 10 has the same depth as the conventional cinder block, concrete block or masonry block 13. In other words, the block 13 has first and second vertical side wall portions 64 and 66 that form the faces of the block wall 11. The first and second vertical side wall portions 64 and 66 of the blocks 13 are aligned with the first and third rectangular metal plate members 12 and 28 of the electrical box block 10. Thus, the first and third rectangular metal plate members 12 and 28 are first and second exterior rectangularly shaped members that form part of the faces of the block wall 11. The second rectangular metal plate member 14 is an interior rectangularly shaped member. The interior member 14 together with the four metal spacer members 16, 18, 20 and 22, and the two horizontal metal members 24 and 26 form a connecting structure that couples the first and second exterior rectangularly shaped members 12 and 28 together. Thus, the connecting structure (members 14, 16, 18, 20, 22, 24 and 26) maintains the first and second exterior rectangularly shaped members 12 and 28 at a distance such that the first and second exterior rectangularly shaped members 12 and 28 are aligned with the first and second side wall portions of the block 13. As shown in FIGS. 5–6, the parts of the connecting structure (members 14, 20, 22, 24 and 26) together form a rectangularly shaped box 29 with the second exterior rectangularly shaped member 28. FIGS. 5–6 show that the second exterior rectangularly shaped member 28 is not attached to the rectangularly shaped box 29, such that the rectangularly shaped box 29 is an open-ended box. Optionally, the second exterior rectangularly shaped member 28 can be attached to the members 20, 22, 24 and 26 to form a closed-ended rectangularly shaped box 29', as shown in FIGS. 1–4. FIGS. 5–6 show that the members 20, 22, 24 and 26 together form a tubular member of the rectangularly shaped box 29, and FIGS. 1–4 show that the members 20, 22, 24 and 26 also form a tubular member of the rectangularly shaped box 29'. As shown in FIG. 5, the tubular member has a longitudinal axis A—A, which is substantially perpendicular to an outer surface of the second rectangular metal plate member 14 (the interior member).

It will be apparent to those skilled in the art from this disclosure that these metal plate members 12, 14, 16, 18, 20, 22, 24, 26 and 28 can be constructed of several plates which are fixedly secured together by suitable means such as welding. It will also be apparent to those skilled in the art from this disclosure that some of these metal plate members 12, 14, 16, 18, 20, 22, 24, 26 and 28 can be constructed from a single plate which is bent to form two or more of the metal plate members. For example, the first and second rectangular metal members 12 and 14 can be integrally formed with metal spacer member 16 by bending a metal plate into a U-shaped member.

In the illustrated embodiment, the first and second rectangular metal plate members 12 and 14 are both preferably constructed of one-quarter (¼") inch thick mild steel plates. However, lesser gauges of steel can be used if applicable. The first and second rectangular metal plate members 12 and 14 each have a height "A" of about seven and five-eighths (7⅝") inches, a length "B" of about seven and five-eighths (7⅝") inches. The depth "C" of block 10 is preferably about seven and five-eighths (7⅝") inches. Similarly, third rectangular metal plate member 28 is constructed of ten gauge mild steel plate which has a height and a length that are substantially the same as the first and second metal plate members 12 and 14. In the case of a full size block, the rectangular metal plate members 12, 14 and 28 are preferably constructed with a height "A" of about eight and five-eighths (8⅝") inches and a width "B" of about fifteen and five-eighths (15⅝") inches. The depth "C" of a full size block 10 would still preferably be about seven and five-eighths (7⅝") inches. Of course, it will be apparent to those skilled in the art from this disclosure that the size of the embeddable fixture mounting device or electrical box block 10 can be other sizes depending upon the cinder blocks, concrete blocks or masonry blocks being used therewith.

Figure 2:
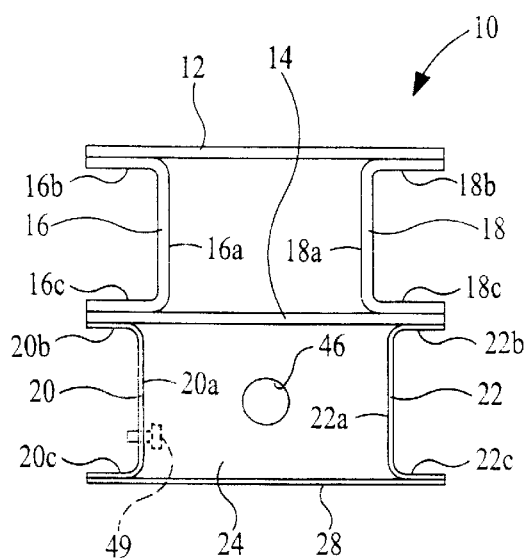
FIG. 2 is a top plan view of the embeddable mounting device or electrical box block illustrated in FIG. 1 in accordance with the first embodiment of the present invention.

Referring now to FIG. 2, the first and second rectangular metal plate members 12 and 14 are planar members, which are secured together by the first and second spacer members 16 and 18 so as to be spaced a predetermined distance apart from each other. The first and second spacer members 16 and 18 hold the first and second rectangular metal plate members 12 and 14 substantially parallel to each other. A concrete or cement receiving cavity 30 is formed between the first and second rectangular metal plate members 12 and 14 and the first and second spacer members 16 and 18.

As seen in FIGS. 5 and 6, the cavity 30 is designed to receive reinforcing bars 32 and cement 34 therein. The first and second spacer members 16 and 18 are preferably constructed from one-quarter (¼") inch thick mild steel plate. The first and second spacer members 16 and 18 can have the same or a smaller height than the first and second rectangular metal plate members 12 and 14. Moreover, the height of the first and second spacer members 16 and 18 can vary if needed and/or desired.

The side edges of first and second spacer members 16 and 18 are bent to form attachment flanges. These bends of spacer members 16 and 18 preferably have a radius of about one-quarter (¼") inch radius. These bends are located about one (1") inch from the side edges and run parallel to the rectangular metal plate members. These bends are formed in a manner to form spacer members 16 and 18 with U-shaped cross sections. The spacer members 16 and 18 each includes a central section 16a or 18a, a first leg section 16b or 18b and a second leg section 16c or 18c respectively. The leg sections 16b and 18b are fixedly coupled to the first rectangular metal plate member 12, while the leg sections 16c and 18c are fixedly coupled to the second rectangular metal plate member 14.

The side edges of third and fourth spacer members 20 and 22 are bent to form attachment flanges. These bends preferably each have a radius of about one-quarter (¼") inch. The bends are located about one (1") inch from the side edge and run parallel to the rectangular metal plate members. The bends are formed in a manner to form spacer members 20 and 22 with U-shaped cross sections. The spacer members 20 and 22 each includes a central section 20a or 22a, a first leg section 20b or 22b and a second leg section 20c or 22c, respectively. Leg sections 20c and 22c of third and fourth spacer members 20 and 22 have been drilled and tapped to form a pair of mounting flanges with threaded holes 42 that receive security screws 44 for securing the third rectangular metal plate member 28 thereto.

The first and second horizontal plate members 24 and 26 or first and second opposed walls 24 and 26 are fixedly secured to the second rectangular metal plate member 14 and the third and fourth spacer members 20 and 22. The first and second horizontal plate members 24 and 26 extend substantially perpendicular to the second rectangular metal plate member 14, as well as extend substantially perpendicular to the central sections 20a and 22a of the spacer members 20 and 22. Accordingly, the rectangularly shaped box 29 has a rectangular cross section that is formed by the central sections 20a and 22a or third and fourth opposed walls 20a and 22a and the horizontal plate members 24 and 26 (first and second opposed walls). FIGS. 5–6 show that the first and second opposed walls and the third and fourth opposed walls can extend outwardly from the outer surface of the second rectangular metal plate member 14 to form an open end of the rectangularly shaped box 29. The first and second opposed walls and the third and fourth opposed walls can extend inwardly from an inner surface of the second exterior rectangularly shaped member 28, as shown in FIGS. 1–4. FIGS. 1–4 show that the first and second opposed walls and the third and fourth opposed walls are substantially perpendicular to the inner surface of the second exterior rectangularly shaped member 28.

When the third rectangular plate member 28 is attached to the second legs 20c and 22c of the third and fourth spacer members 20 and 22, an electrical enclosure is formed. This enclosure can be an electrical outlet box by itself, or can have an electrical box 40a or 40b fixedly secured therein. The third and fourth spacer members 20 and 22 can be inverted and the first and second horizontal plate members or walls 24 and 26 can be made longer to increase the internal volume of the enclosure without increasing the overall size of the mounting device 10.

Figure 3:
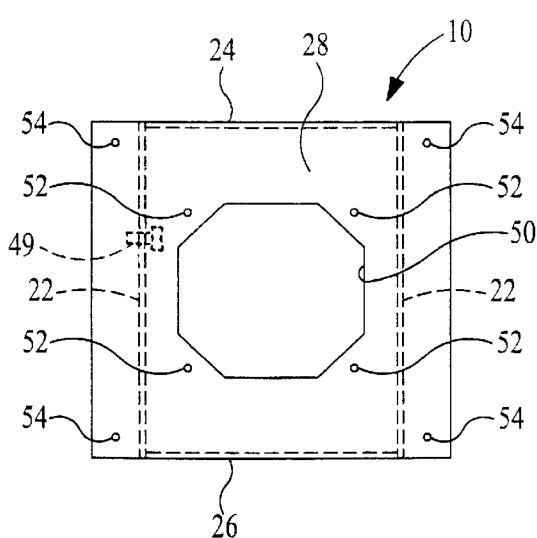
FIG. 3 is a front elevational view of the embeddable mounting device for block illustrated in FIGS. 1 and 2 in accordance with the first embodiment of the present invention.
Figure 4:
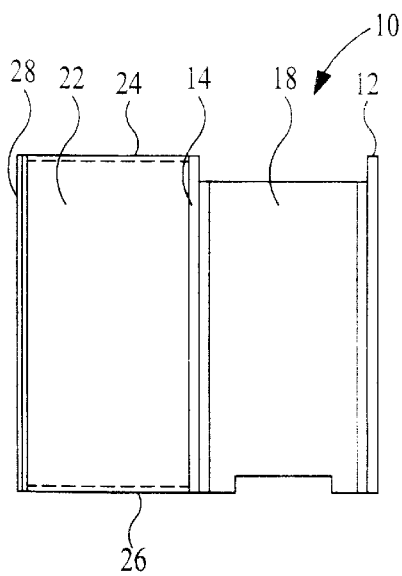
FIG. 4 is a right side elevational view of the embeddable mounting device or block illustrated in FIGS. 1–3 in accordance with the first embodiment of the present invention.

As best seen in FIGS. 5 and 6, the first and second horizontal plate members 24 and 26 each have a punch-out or hole 46 or 48 for receiving an electrical conduit therethrough. Holes 46 and 48 or conduit openings 46 and 48 are preferably aligned with each other and located in the center of their respective horizontal plate members 24 or 26. As seen in FIGS. 2 and 3, a ground screw 49 can be threaded into a hole in the spacer member 20. The precise location of the ground screw 49 is not important. Thus, the ground screw 49 could be coupled to one of the horizontal plate members 24 or 26, if desired.

Referring again to FIGS. 1 and 3, the third rectangular plate member 28 has a centrally located cutout or opening 50, four mounting holes 52 located symmetrically around the cutout or opening 50 and four mounting holes 54 located at the corners of the third rectangular plate member 28. The opening 50 can be, for example, an octagonal cutout, which measures three and one-half (3½") inches by four (4") inches. Of course, opening 50 can have other shapes as needed and/or desired. The four mounting holes 52 are located symmetrically around the cutout or opening 50 and are preferably ³⁄₁₆" holes for receiving screws 56 therethrough to mount the fixture 58 (FIG. 5) or the wiring device 60 (FIG. 6) thereto. More specifically, the screws 56 first extend through holes in the mounting plate 59 of the fixture 58 (FIG. 5) or the face plate 61 of the wiring device 60 (FIG. 6). Then, the screws 56 extend through the mounting holes 52 of the third plate member 28 where the screws 56 are threaded into the threaded holes of the electrical box 40a or 40b. Alternatively, mounting holes 52 can be threaded for threadedly receiving the screws 56 to secure the electrical fixture 58 or the wiring device 60 directly to the third rectangular plate member 28.

The four mounting holes 54 of the third rectangular plate member 28 are preferably 3/16" holes, which are located one-half (½") inch inward from each corner of the third rectangular plate member 28. Holes 54 threadedly receive security screws 44 therein to removably secure the third rectangular plate member 28 to leg sections 20c and 22c of spacer members 20 and 22.

Referring again to FIGS. 5 and 6, perspective views of partially constructed concrete block walls 11 are illustrated. Block wall 11 is constructed from a plurality of conventional blocks 13 such as cinder blocks, concrete blocks or masonry blocks. Each of the blocks 13 includes a pair of cement receiving cavities 62. A mounting device 10 is shown installed between the concrete blocks 13 so that the mounting device 10 becomes an integral part of block wall 11.

An exemplary method of installing the embeddable mounting device into the block wall 11 will now be described with general reference to FIGS. 1–4 and particular reference to FIGS. 5 and 6. In this exemplary method of permanently attaching and embedding the electrical box 10 into the block wall 11, the method includes the step of installing at least one mounting device or steel block 10, as described above, into the block wall 11 in place of one of the blocks 13 during construction of the block wall 11. Installation of mounting device or steel block 10 is as follows. First, the cinder, concrete or masonry blocks 13 are laid down to begin construction of the concrete wall 11. Next, the mounting device 10 is placed unto one or more of the cinder, concrete or masonry blocks 13 of the wall 11 in a desired location. One of the reinforcing bars 32 is received in the cavity 30 of the mounting device or steel block 10. The cavity 30 is at least partially aligned with one of the cement receiving cavities 62 of one of the cinder, concrete or masonry blocks 13. With the vertical reinforcing bars 32 in place, a cementing slurry mixture is then poured into the cavities 30 and 62 in a manner such that the vertical reinforcing bars 32 and a quantity of the cementing slurry mixture fill the cement receiving cavity 30 of mounting device or steel block 10 and the cement receiving cavities 62 of cinder, concrete or masonry blocks 13.

The cementing slurry mixture is then allowed to harden while the wall 11 is fully constructed. Once wall 11 is fully constructed, an electrical device, such as a lighting fixture 58 or wiring device 60 can be affixed to the third rectangular metal plate member 28.

Second Embodiment

Figure 7:
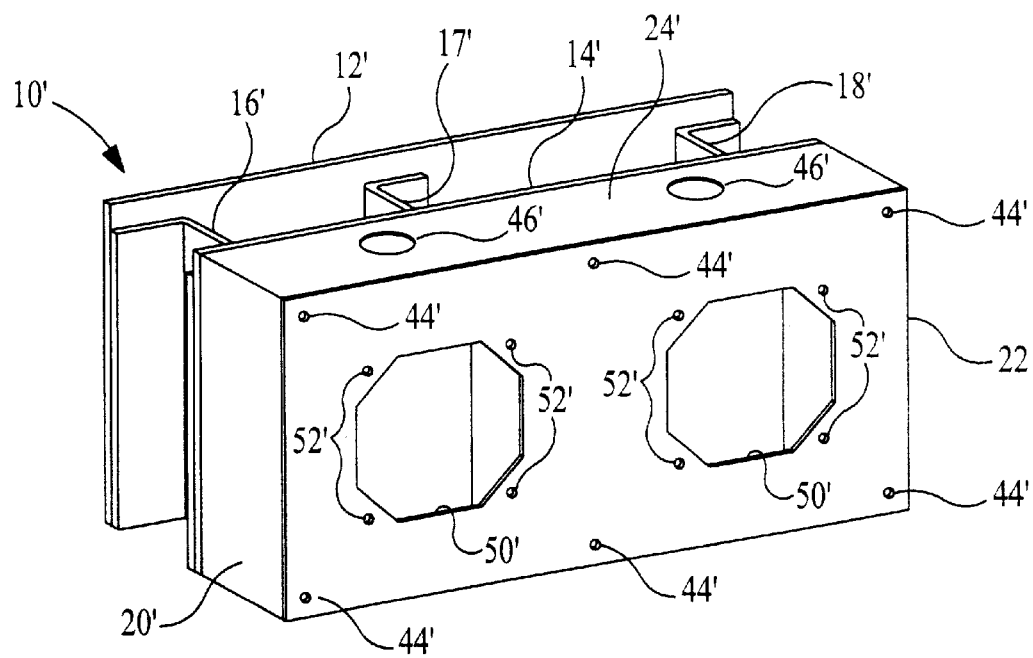
FIG. 7 is a perspective view of an embeddable mounting device in the form of an electrical box block in accordance with another embodiment of the present invention.
Figure 8:
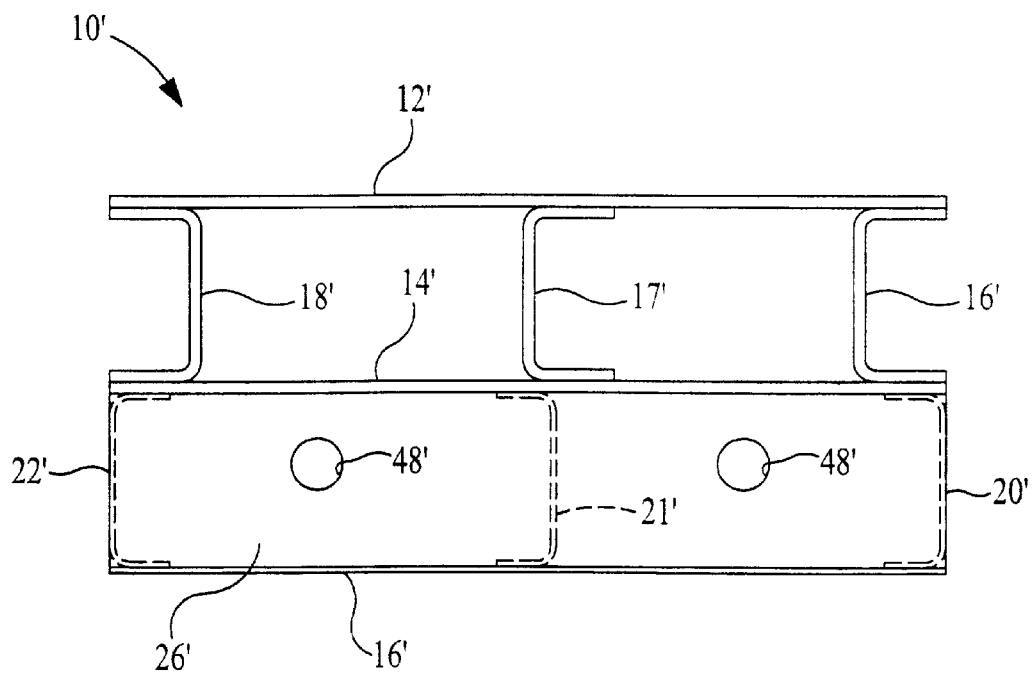
FIG. 8 is a bottom plan view of the embeddable mounting device or electrical box block illustrated in FIG. 7 in accordance with the second embodiment of the present invention.

Referring now to FIGS. 7 and 8, a perspective view of an embeddable mounting device or electrical box block 10' is illustrated in accordance with another embodiment of the present invention. The mounting device or steel block 10' is basically identical to the steel electrical block 10, as discussed above, except that the mounting device or steel block 10' is a full size block which forms a pair of electrical enclosures or boxes. In view of the similarities between the steel block 10' and the steel block 10, the steel block 10' will not be discussed or illustrated in detail herein. Accordingly, in the following description of the second embodiment of the present invention, parts and portions which are the same as or similar to those of the first embodiment will be given the same reference numbers but with a prime (') added to the reference numbers.

Basically, the mounting device or steel block 10' includes three generally rectangular metal members 12', 14' and 28', six metal spacer members 16', 17', 18', 20', 21' and 22', and two horizontal metal members 24' and 26'. Preferably, these metal members are constructed of metal plates to form a metal block, which are capable of mounting an electrical fixture or device. The embeddable mounting device or electrical box block 10' is designed to be grouted just like the steel block 10 and the cinder, concrete or masonry blocks 13, which are discussed above. This size of block 10' allows the block to completely fill the space normally occupied by a conventional full size cinder block, concrete block or masonry block. Thus, the embeddable mounting device or electrical box block 10' preferably has a height "A" between about seven inches and nine inches, a length "B" between about fifteen inches and seventeen inches and a depth or width "C" preferably between seven inches and nine inches.

Third Embodiment

Figure 14:
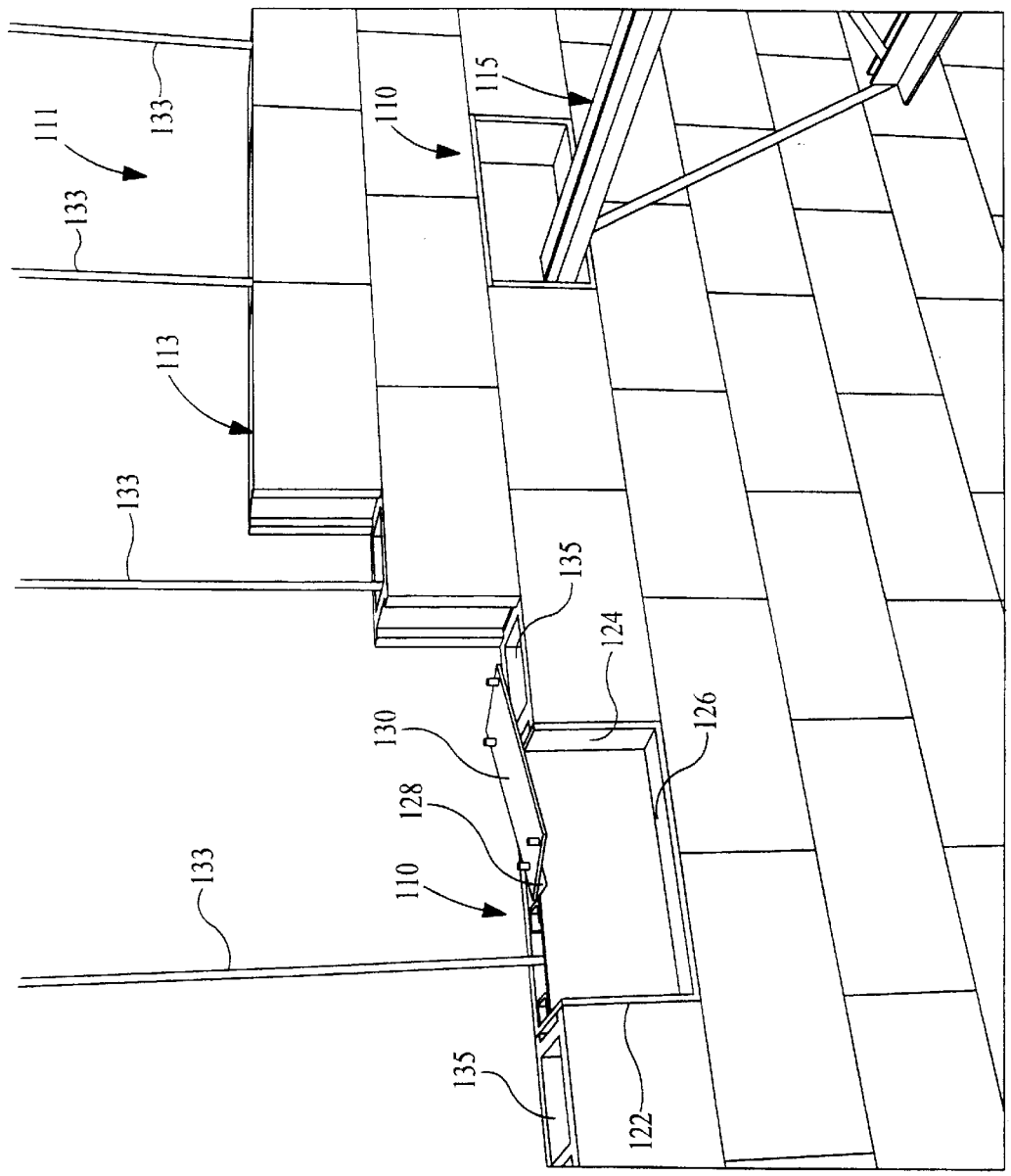
FIG. 14 is a partial perspective view of a block with two embedded mounting devices or joist support blocks of type illustrated in FIGS. 11–13 mounted therein.

Referring now to FIGS. 9–14, an embeddable mounting device or joist support block 110 is illustrated in accordance with another embodiment of the present invention. Mounting device or steel block 110 of this embodiment is especially designed for supporting a joist or support member 115 as seen in FIG. 14. Mounting device or steel block 110 basically includes a pair of generally rectangular metal members 112 and 114, three metal spacer members 116, 118 and 120, two vertical metal support walls or members 122 and 124 and a horizontal metal support wall or member 126. Preferably, these metal members are constructed of metal plates to form a metal block, which are capable of supporting the joist or support member 115. As seen in FIG. 14, the embeddable mounting device or joist support block 110 is embedded within a block wall 111, which is constructed of concrete, cinder or masonry blocks 113.

While the mounting device or joist support block 110 is illustrated as a full block, it will be apparent to those skilled in the art from this disclosure that the mounting device or joist support block 110 can be a half block, i.e., the same size as a standard half concrete, cinder or masonry block. The embeddable mounting device or joist support block 110 is designed to be grouted just like the concrete, cinder or masonry blocks 113 or the steel electrical box block 10, discussed above. Thus, the embeddable mounting device or joist support block 110 preferably has a height "A" between about seven inches and nine inches, a length "B" between about fifteen inches and seventeen inches and a depth "C" preferably between seven inches and nine inches. This size of block 10 allows the block to completely fill the space normally occupied by a conventional concrete, cinder or masonry block.

It will be apparent to those skilled in the art from this disclosure that these metal plate members 112, 114, 116, 118, 120, 122, 124 and 126 can be constructed of several plates which are fixedly secured together by suitable means such as welding. It will also be apparent to those skilled in the art from this disclosure that some of these metal plate members 112, 114, 116, 118, 120, 122, 124 and 126 can be constructed formed of a single plate which is bent to form two or more of the metal plate members. For example, the first and second rectangular metal members 112 and 114 can be integrally formed with metal spacer member 116 by bending a metal plate into a U-shaped member.

In the illustrated embodiment, the first and second rectangular metal plate members 112 and 114 are both preferably constructed of one-quarter (¼") inch thick mild steel plates. Of course, the first and second rectangular metal plate members 112 and 114 can be fabricated of a lesser gauge metal plate if needed and/or desired. The first and second rectangular metal plate members 112 and 114 preferably are dimensioned to have a height "A" of approximately seven and five-eighths (7⅝") inches and a length "B" of approximately fifteen and five-eighths (15⅝") inches. The depth "C" of block 110 is preferably approximately seven and five-eighths (7⅝"). Of course, it will be apparent to those skilled in the art from this disclosure that the size of the embeddable mounting device or joist support block 110 can be other sizes depending upon the other blocks being used therewith.

Figure 9:
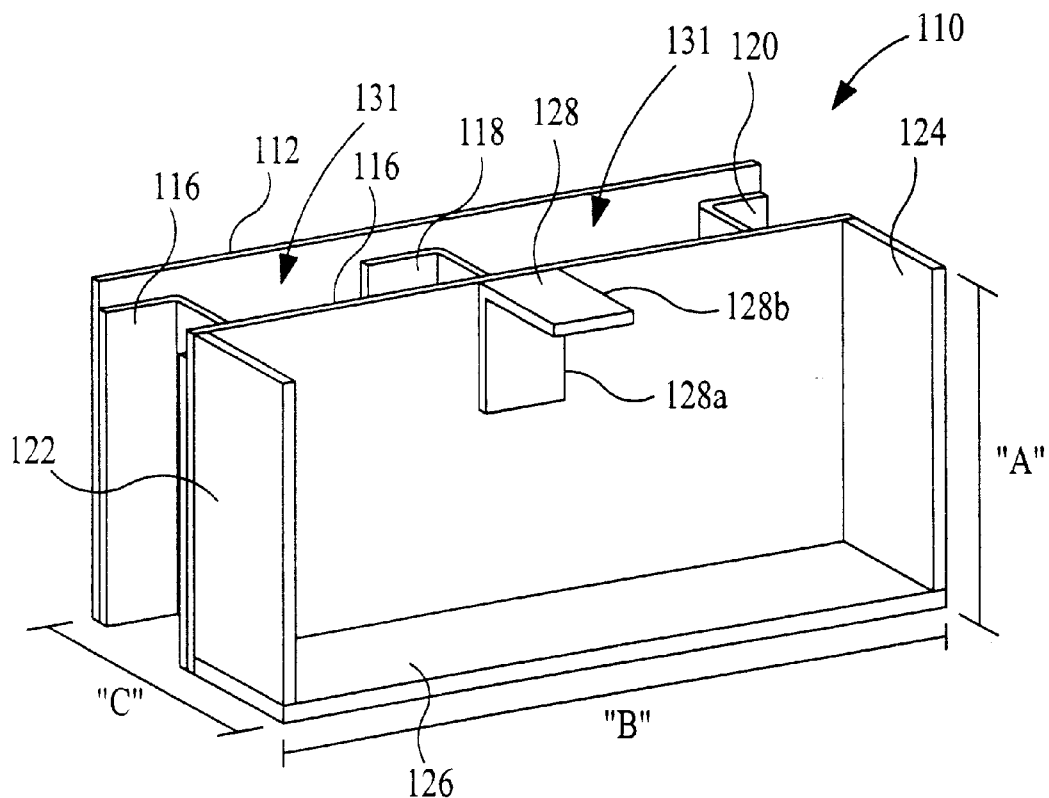
FIG. 9 is a partial perspective view of an embeddable mounting device or joist support block in accordance with another embodiment of the present invention.

As best seen in FIG. 9, an L-shaped support bracket 128 is fixedly secured to the outer surface of the second rectangular metal plate member 114 by suitable means. Bracket 128 is located at the upper edge of the second rectangular metal plate member 114 such that the upper surface is substantially aligned with the upper edge of the second rectangular metal plate member 114. The bracket 128 is constructed of a hard rigid material such as a steel angle member. The dimensions of each planar section 128a and 128b of bracket 128 are preferably approximately three (3") inches in length and two (2") inches wide. Preferably, the thickness of the material used to create bracket 128 is about one-quarter (¼") inch thick. Bracket 128 is located mid-way between the vertical edges of the second rectangular metal plate member 114 so that the end of a concrete, cinder or masonry block 113 will be supported thereon.

Figure 10:
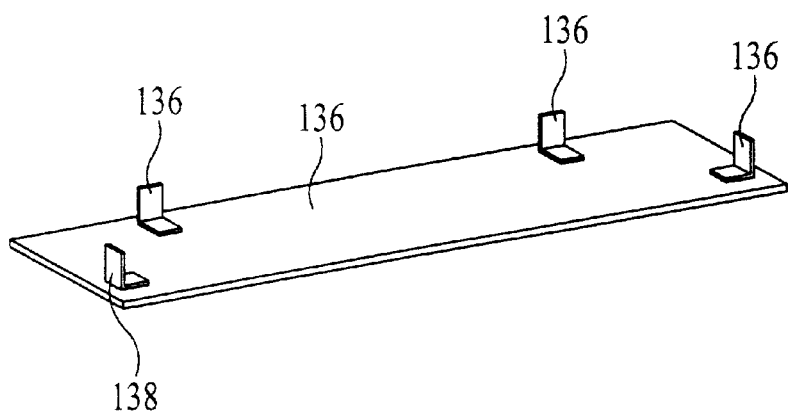
FIG. 10 is a perspective view of a cover plate member for the embeddable mounting device or block illustrated in FIG. 9 in accordance with the third embodiment of the present invention.

As can best be seen in FIG. 10, an optional cover plate member 130 is provided for covering the opening of the U-shaped support member formed by plate members or walls 122, 124 and 126. Cover plate member 130 is preferably constructed from a flat planar metal material such as fourteen gauge steel plate. The cover plate member 30 is preferably dimensioned to have a length of approximately fifteen and five-eighths (15⅝") inches, and a width of approximately four and five-eighths (4⅝") inches. On the bottom side of the cover plate member 130 are four clips 132, 134, 136 and 138. Clips 132 and 136 are designed to engage second rectangular metal plate member 114, while clips 134 and 138 are designed to engage the side support walls or members 122 and 124, respectively. Clips 132, 134, 136 and 138 are preferably L-shaped members which are fixedly secured to the bottom surface of the cover plate member 130. The bottom surface of cover plate member 130 also preferably rests on top of the bracket 128.

Figure 11:
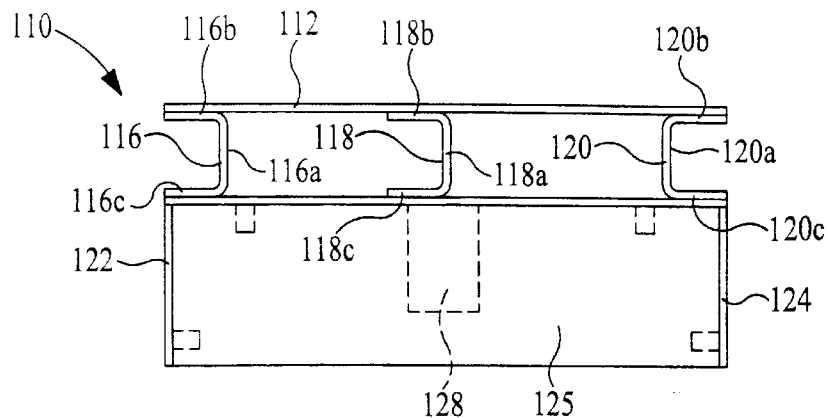
FIG. 11 is a top plan view of the embeddable mounting device or joist support block illustrated in FIG. 9 with the cover plate member mounted thereto in accordance with the third embodiment of the present invention.
Figure 12:
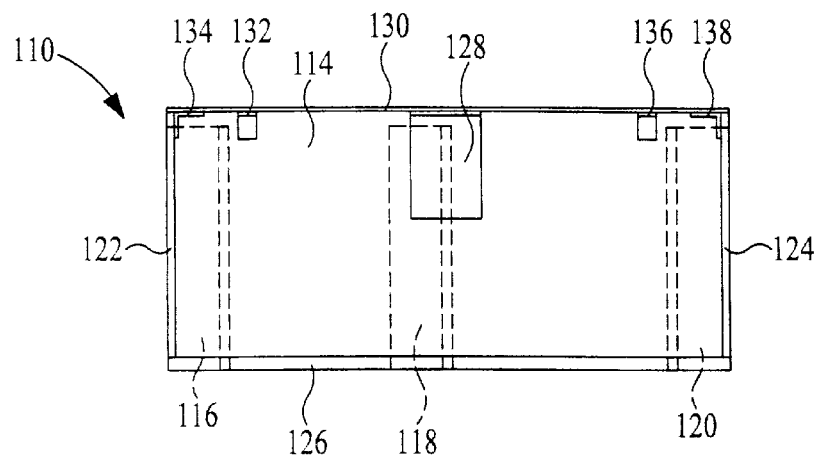
FIG. 12 is a front elevational view of the embeddable mounting device or block illustrated in FIG. 11 in accordance with the second embodiment of the present invention.
Figure 13:
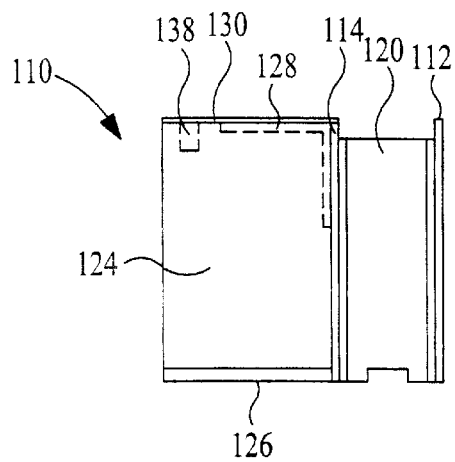
FIG. 13 is a right side elevational view of the embeddable mounting device or block illustrated in FIGS. 11 and 12 in accordance with the second embodiment of the present invention.

Referring now to FIG. 11, the first and second rectangular metal plate members 112 and 114 are secured together by the first, second and third spacer members 116, 118 and 120 so as to be spaced a predetermined distance apart from each other. The first, second and third spacer members 116, 118 and 120 hold the first and second rectangular metal plate members 112 and 114 substantially parallel to each other. Two concrete receiving cavities 131 are formed between the first and second rectangular metal plate members 112 and 114 and the first, second and third spacer members 116, 118 and 120.

As seen in FIG. 14, the cavities 131 are designed to be able to receive one of the reinforcing bars 133 and cement 135 therein. The first, second and third spacer members 116, 118 and 120 are preferably constructed from one-quarter (¼") inch thick steel plate. The first, second and third spacer members 116, 118 and 120 can have the same or a smaller height than the first and second rectangular metal plate members 112 and 114. Moreover, the heights of the first, second and third spacer members 116, 118 and 120 can vary if needed and/or desired.

The side edges of first, second and third spacer members 116, 118 and 120 are bent to form attachment flanges. The bends preferably have a radius of about one-quarter (¼") inch radius, which is located about one (1") inch from the side edge and runs parallel to the rectangular metal plate members 112 and 114. These bends are formed in a manner to form spacer members 116, 118 and 120 with U-shaped cross sections. The spacer members 116, 118 and 120 each includes a central section 116a, 118a or 120a, a first leg section 116b, 118b or 120b and a second leg section 116c, 118c or 120c, respectively. As seen in FIG. 11, the leg sections 116b, 118b or 120b are fixedly coupled to the first rectangular metal plate member 112, while the leg sections 116c, 118c and 120c are fixedly coupled to the second rectangular metal plate member 114.

The metal plate members or support walls 122, 124 and 126 are secured together by the second rectangular plate member 114 to form a U-shaped member with a space therebetween for receiving the joist or structural support member 115 as seen in FIG. 14. The support walls or members 122, 124 and 126 are preferably constructed from ten gauge steel plate. The side support walls or members 122 and 124 preferably have the same height as the first and second rectangular metal plate members 112 and 114. Of course, the height of side support walls or members 122 and 124 can be slightly smaller if needed and/or desired.

The horizontal plate member or lower support wall 126 is fixedly secured to the second rectangular metal plate member 114 in a conventional manner. The horizontal plate member or lower support wall 126 has a length "A" which is substantially equal to the length "A" of the first and second rectangular plate members 112 and 114. The horizontal plate member or lower support wall 126 extends substantially perpendicular to the second rectangular metal plate member 114, as well as extends substantially perpendicular to the side support walls 122 and 124. The lower support wall 126 rests on the cement overlying the concrete, cinder or masonry blocks 113 that supports the joist support block 110. The structural support member 115 rests on the lower support wall 126.

Referring to FIGS. 14, a perspective view of a partially constructed concrete block wall 111 is illustrated. Block wall 111 is constructed from a plurality of conventional concrete, cinder or masonry blocks 113. Each of the concrete, cinder or masonry blocks 113 includes a pair of cement receiving cavities 162. A pair of mounting devices or steel blocks 110 is shown installed between concrete, cinder or masonry blocks 113.

An exemplary method of installing the embeddable mounting devices or steel blocks 110 into the block wall 111 will now be described with general reference to FIGS. 9–13 and particular reference to FIGS. 14. In the exemplary method of permanently attaching and embedding the joist support block 110 into the block wall 111, the method includes the step of installing at least one mounting device or steel block 110, as described above, into the block wall 111 in place of one of the blocks 113 during construction of the block wall. Installation of mounting device or block 110 is as follows. First, concrete, cinder or masonry blocks 113 are laid down to begin construction of the concrete wall 111. Next, the mounting device or steel block 110 is placed unto one or more of the blocks 113 of the wall 111 in a desired location. One of the reinforcing bars 133 is received in the cavity 131 of the mounting device or steel block 110. The cavities 131 are at least partially aligned with one of the cement receiving cavities 162 of one of the blocks 113. With the vertical reinforcing bars 133 in place, a cementing slurry mixture is then poured into the cavities 131 and 162 in a manner such that the vertical reinforcing bars 133 and a quantity of the cementing slurry mixture fill the cement receiving cavities 131 of mounting device or steel block 110 and the cement receiving cavities 162 of blocks 113. Before placing cover plate member 130 on the mounting device or steel block 110, the joist or support member 115 is maneuvered so that its end rests on the lower support wall 126. Now the optional cover plate member 130 can be installed on the mounting device or steel block 110 if needed and/or desired. The purpose of the cover plate member 130 is to limit contaminants, i.e., the cementing slurry mixture or other fill, from falling into the U-shaped support formed by the support walls 122, 124, and 126. The cementing slurry mixture is then allowed to harden while the block wall 111 is fully constructed.

While three embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents. In other words, it is to be understood that the details herein are to be interpreted as illustrative and not in a limiting sense, and that many varying and different embodiments may be made within the scope of the inventive concept(s) taught herein.

What is claimed is:

1. A method of forming a block wall with an electrical box block, comprising the steps of:
    constructing said block wall with a plurality of blocks coupled together by a cementing slurry, each of said blocks having a first side wall portion and a second side wall portion with a predetermined depth between said first and second side wall portions; and
    installing and securing said electrical box block into said block wall with said cementing slurry in place of one of said blocks, said electrical box block comprising:
        a first generally rectangularly shaped member having a first outer surface, a first inner surface, a first length, a first height and a first predetermined thickness between said first outer surface and said first inner surface;
        a second generally rectangularly shaped member having a second outer surface, a second inner surface, a second length, a second height and a second predetermined thickness between said second outer surface and said second inner surface;
        a pair of first spacer members coupled between said first member and said second member to form a block with a hollow interior in which said first member and said second member are arranged substantially parallel to each other and said first spacer members extend between said first and second members; and
        a rectangularly shaped box extending from said second generally rectangularly shaped member, said rectangularly shaped box having first and second opposed walls and third and fourth opposed walls, said first, second, third and fourth walls extending outwardly from said second outer surface of said second generally rectangularly shaped member to form an open end of said rectangularly shaped box, each of said first and second walls having a conduit opening therein.

2. A method of forming a block wall with an electrical box block, comprising the steps of:
    constructing said block wall with a plurality of blocks coupled together by a cementing slurry, each of said blocks having a first side wall portion and a second side wall portion with a predetermined depth between said first and second side wall portions; and
    installing and securing said electrical box block into said block wall with said cementing slurry in place of one of said blocks, said electrical box block comprising:
        a first exterior rectangularly shaped member having a first outer surface, a first inner surface, a first length, a first height and a first predetermined thickness between said first outer surface and said first inner surface;
        a second exterior rectangularly shaped member having a second outer surface, a second inner surface, a second length, a second height, a second predetermined thickness between said second outer surface and said second inner surface and an opening extending through said second predetermined thickness; and
        a connecting structure coupled between said first and second exterior rectangularly shaped members to maintain said first and second exterior rectangularly shaped members at a distance such that said first and second exterior rectangularly shaped members are aligned with said first and second side wall portions, and to form an open box with said second exterior rectangularly shaped member,
        said connecting structure including first and second opposed walls and third and fourth opposed walls, said first, second, third and fourth walls extending inwardly and substantially perpendicular to said second inner surface of said second exterior rectangularly shaped member.

3. The method according to claim 2, further comprising forming a cement receiving cavity with said connecting structure, and pouring said cementing slurry into said cement receiving cavity.

4. The method according to claim 3, wherein said forming of said cement receiving cavity includes providing an interior member that is substantially parallel to said first and second rectangularly shaped exterior members and a pair of spacer members coupled between said first rectangularly shaped exterior member and said interior member.

5. The method according to claim 4, further comprising providing a reinforcing bar, and inserting said reinforcing bar into said cement receiving cavity.

6. The method according to claim 4, wherein said open box formed by said connecting structure and said second exterior rectangularly shaped member having said first and second opposed walls with predetermined lengths and said third and fourth opposed walls with predetermined heights that are substantially equal to said second height, each of said first and second walls having a conduit opening therein.

7. The method according to claim 2, wherein said second exterior rectangularly shaped member is detachable coupled to said connecting structure.

8. The method according to claim 2, wherein said blocks have a length that is twice said first and second lengths of said first and second rectangularly shaped exterior members of said electrical box block.

9. The method according to claim 2, wherein said blocks have a length that is half said first and second lengths of said first and second rectangularly shaped exterior members of said electrical box block.

10. The method according to claim 2, wherein said first and second rectangularly shaped exterior members are formed of metal.

11. The method according to claim 2, further comprising providing said open box formed by said connecting structure and said second exterior rectangularly shaped member with an electrical box.

12. A method of forming a block wall with an electrical box block, comprising:

constructing said block wall with a plurality of blocks coupled together by a cementing slurry, each of said blocks having a first side wall portion and a second side wall portion with a predetermined depth between said first and second side wall portions; and installing and securing said electrical box block into said block wall with said cementing slurry in place of one of said blocks, said electrical box block comprising:

a first generally rectangularly shaped member having a first outer surface, a first inner surface, a first length, a first height and a first predetermined thickness between said first outer surface and said first inner surface;

an interior member having a second outer surface, a second inner surface, and a second predetermined thickness between said second outer surface and said second inner surface;

a pair of first spacer members coupled between said first member and said interior member to form a block with a hollow interior, said first spacer members extending between said first and interior members; and a tubular member extending from said second outer surface of said interior member and having at least one conduit opening therein, said tubular member having a longitudinal axis that is substantially perpendicular to said second outer surface of said interior member.

13. The method according to claim 2, further comprising securing an interior member to said connecting structure.

14. The method according to claim 12, further comprising securing a third member to said tubular member.

15. The method according to claim 14, further comprising mounting a wiring device to said third member prior to securing said third member to said tubular member.

16. The method according to claim 14, further comprising mounting an electrical fixture to said third member.

17. The method according to claim 12, further comprising providing an electrical box in said tubular member.

18. The method according to claim 12, further comprising forming a cement receiving cavity including said second member and said pair of first spacer members, and pouring said cementing slurry into said cement receiving cavity.

19. The method according to claim 18, further comprising providing a reinforcing bar, and inserting said reinforcing bar into said cement receiving cavity.

20. The method according to claim 17, further comprising securing a third member to said tubular member; and securing a wiring device to said third member and said electrical box in said tubular member.

* * * * *